United States Patent [19]

Tien

[11] Patent Number: 4,533,647

[45] Date of Patent: Aug. 6, 1985

[54] CERAMIC COMPOSITIONS

[75] Inventor: Tseng-Ying Tien, Ann Arbor, Mich.

[73] Assignee: The Board of Regents acting for and on behalf of the University of Michigan, Ann Arbor, Mich.

[21] Appl. No.: 546,119

[22] Filed: Oct. 27, 1983

[51] Int. Cl.[3] .................... C04B 35/10; C04B 35/12; C04B 35/48
[52] U.S. Cl. .................................. 501/105; 501/128; 501/153
[58] Field of Search .................... 501/105, 128, 153

[56] References Cited

U.S. PATENT DOCUMENTS

| 3,152,523 | 10/1964 | Whitfield et al. | 92/213 |
| 4,053,321 | 10/1977 | Okumiya et al. | 501/105 |
| 4,210,454 | 7/1980 | Rechter | 501/128 X |
| 4,245,611 | 1/1981 | Mitchell et al. | 92/212 |
| 4,421,861 | 12/1983 | Claussen et al. | 501/103 |

OTHER PUBLICATIONS

"Ceramic Engines" *Popular Science*, Mar. 1982, pp. 65, 66.
*Motorcyclist*, Oct. 1981, p. 48.

Primary Examiner—Howard S. Williams
Attorney, Agent, or Firm—Head, Johnson & Stevenson

[57] ABSTRACT

Novel transformation toughened ceramic compositions comprising finely divided $ZrO_2$-$HfO_2$ solid solution particles dispersed in a $Al_2O_3$-$Cr_2O_3$ (alumina) or $3Al_2O_3.2SiO_2$-$3Cr_2O_3.2SiO_2$ (mullite) solid solution matrix phase. It is found that increased hardness and modulus associated with higher relative $Cr_2O_3$ content (e.g. 20 mole %) in the matrix phase and increased fracture toughness associated with higher relative $HfO_2$ content (e.g. 10 to 20 mole %) in the disperse phase represent viable and improved ceramic compositions. Such transformation toughened ceramic compositions are considered useful in superhot light diesel engine applications, high temperature gas turbines and ultrahigh temperature ceramic heat exchangers.

18 Claims, 23 Drawing Figures

CERAMIC COMPOSITIONS

BACKGROUND OF THE INVENTION

This invention was made with Government support under DAAG-46-82-C-0080 awarded by the Department of Army. The Government has certain rights in this invention.

1. Field of the Invention

This invention relates to a high strength, high toughness and low thermal conductivity ceramic composition. More specifically, this invention relates to a ceramic composite of finely divided $ZrO_2$-$HfO_2$ solid solution particles dispersed in a mixture of $Al_2O_3$-$Cr_2O_3$ solid solution. 2. Brief Description of the Prior Art It is well known in the internal combustion engine art that an increase in temperature in the combustion chamber and a minimization of the associated heat loss during combustion will theoretically result in increased efficiency of the engine. This in turn will lead to improved performance and economy. Thus, the so-called adiabatic (no heat loss) ceramic engine, high temperature ceramic-based turbine and ceramic recuperators (heat exchangers) are well known and publicly acknowledged as contemporary research and development objectives (for example, see "The Coming Age of Ceramic Engines", March 1982, Popular Science, p 64). However, at these higher temperatures, the conventional ceramic materials employed in constructing such devices are inadequate in one or more critical properties.

Thus, in the case of ceramic lined diesel engines and similar applications, the ideal ceramic composition used as a lining material should possess and exhibit high strength, high toughness and very low thermal conductivity at ultrahigh combustion temperatures as well as high resistance to thermal shock, wear and corrosion. Although ceramics are generally known for their high temperature strength, heat resistance and high temperature thermal insulation characteristics, they are also known as being extremely brittle. In general, to overstress a ceramic part leads to disintegration of the ceramic composition.

Although contemporary applications involving calcium and yttrium stablized zirconia are reported to result in improved strength, toughness and thermal conductivity, it has also been reported that such partially stabilized zirconia (PSZ) deteriorates rapidly at temperatures below engine operating temperatures. Furthermore, the use of titanium alloys as found in U.S. Pat. No. 3,152,523; the silicon nitride, lithium aluminium silicate, fused silica, silicon carbide, sintered silicon carbide, reaction sintered silicon carbide and reaction bonded silicon nitride ceramics as proposed in U.S. Pat. No. 4,242,948; and the cordierite, beta spodumene-mullite and fused silica-clay of U.S. Pat. No. 4,245,611 are felt to be deficient as ceramic compositions for the adiabatic engine in one or more of the above critical properties.

More specifically, it is generally known that zirconium dioxide (zirconia) exists in three allotropic forms; monoclinic, tetragonal and cubic and that there is a large volume expansion during the transition from monoclinic to tetragonal. Further, it has been historically accepted that because of this disruptive phase transition, the refractory properties of zirconia cannot be used. However, recent developments relating to suppressing or disrupting the deleterious effects of the phase transition have been discovered. For example, in the so-called partially stabilized zirconia (PSZ) the addition of metal oxide (e.g. lime stabilized zirconia) is viewed as creating a multiphase material having a fine-scale precipitate of monoclinic zirconia in a stabilized cubic matrix which in turn results in enhanced strength. More recently, an even more powerful strengthening mechanism viewed as involving a dispersion of a metastable tetragonal zirconia in cubic zirconia has been suggested. In this more recent development, the martensitic transformation (fast and diffusionless) between monoclinic and tetragonal phases is partially alleviated by inducing and creating tetragonal zirconia in sintered bodies or domains of a resulting time-stabilized zirconia. Although these transformation stabilizing ceramic mechanisms and their underlying rationales may be questionable and although their respective effects on high temperature properties of the resulting transformation toughened ceramics are encouraging, the breadth of applicability of these general principles to the field of ceramics generally and the extent to which the properties can be improved is still not well defined or understood. Thus, the use of transformation toughened ceramics and ceramic coatings in specific pragmatic applications (e.g. light diesel engines and/or ceramic engines) still remains uncertain.

SUMMARY OF THE INVENTION

In view of the deficiencies associated with known ceramic compositions particularly relative to the high temperature properties required in such applications as the ceramic engine, I have discovered an improved ceramic composition comprising:

(a) a matrix phase selected from the group consisting of solid solutions characterized by the formula $Al_2O_3 \cdot 2SiO_2 + x[3Cr_2O_3 \cdot 2SiO_2]$ where x is the relative mole fraction of $Cr_2O_3$ or $3Cr_2O_3 \cdot 2SiO_2$; and (b) a disperse phase characterized by the formula $ZrO_2 \cdot yHfO_2$ where y is the relative mole fraction of $HfO_2$.

The improved ceramic compositions according to the present invention are viewed as transformation toughened ceramics wherein a fine dispersed $ZrO_2$-$HfO_2$ solid solution is present in either a chromium alumina or chromium mullite solid solution matrix wherein the $HfO_2$ and $Cr_2O_3$ content of the respective solid solutions can be selected to optimize the balance of the high temperature properties. According to the present invention, the mole fraction of $Cr_2O_3$ is preferably from about 0.02 (2 mole %) to about 0.3 (30 mole %) and the mole fraction of $HfO_2$ is preferably from about 0 to about 0.5(50 mole %) with 20 mole percent $Cr_2O_3$ and 10 to 20 mole percent $HfO_2$ representing a particularly preferred combination.

It is an object of the present invention to provide material suitable for application as light diesel engine cylinder and head liner and piston cap. It is a further object to provide transformation toughened ceramics useful in the super hot adiabatic engine, gas-turbine engine and recuperator heat exchanger applications. Fulfillment of these objects and the presence and fulfillment of additional objects will be apparent on complete reading of the specification and attached claims when taken in conjunction with the attached drawing.

DESCRIPTION OF THE PREFERRED EMBODIMENTS

Figure 1:
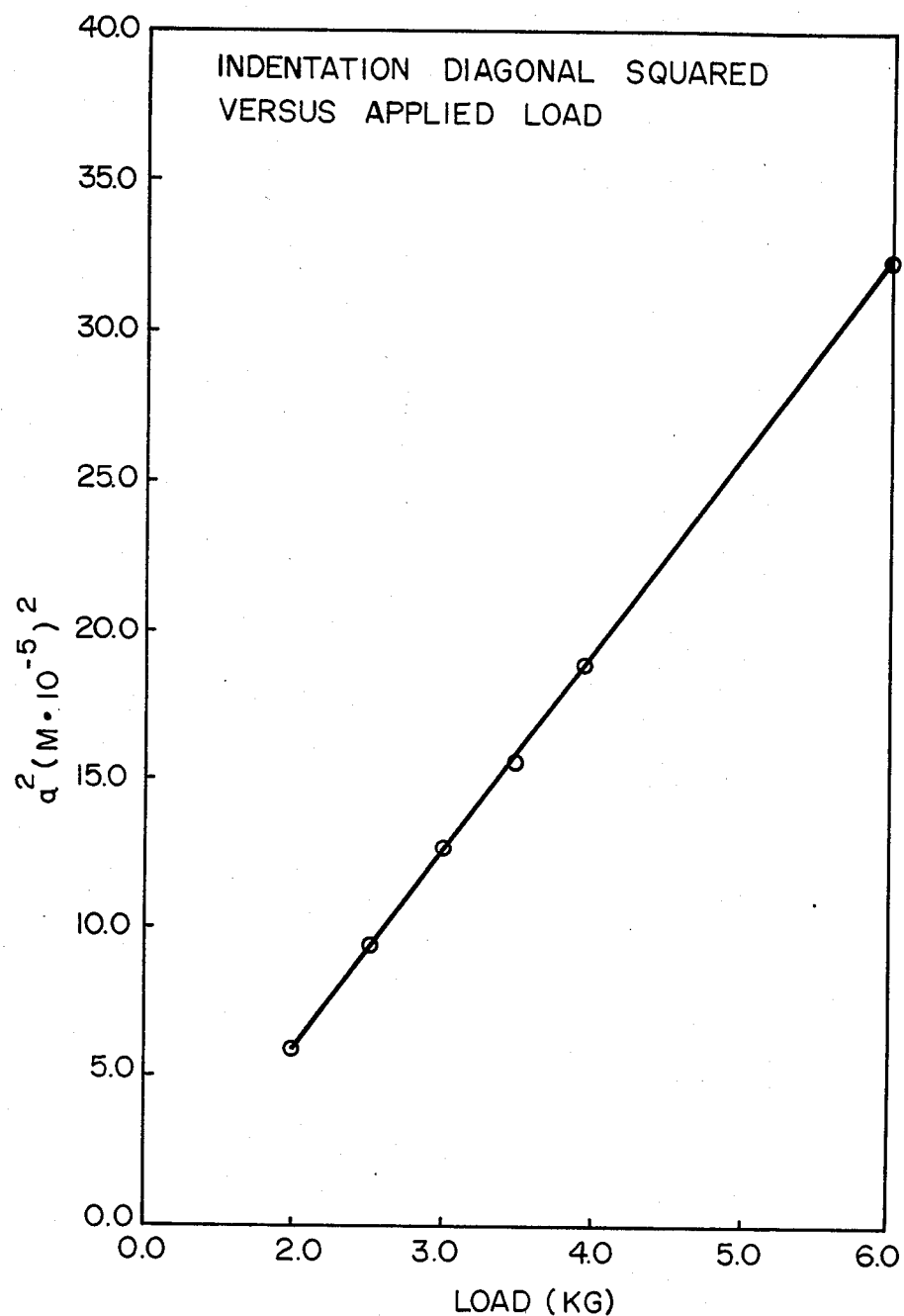
FIG. 1 is a typical plot of the indentation diagonal squared, $a^2$, versus the applied load, P, used to evaluate the hardness, $H_v$, of a ceramic composition according to the present invention.

The novel transformation toughened ceramic compositions according to the present invention, how they are prepared and the pragmatic significance of their high temperature properties can perhaps be best explained and understood by reference to a series of compositions characteristic of the alumina system and the mullite system. The particular alumina system of interest is the ceramic compositions having the continuous matrix phase of $Al_2O_3.xCr_2O_3$ solid solution and a dispersed phase within this continuous matrix phase of finely divided $ZrO_2.yHfO_2$ solid solution particles. The x and y represent the mole fraction or mole percent of $Cr_2O_3$ relative to $Al_2O_3$ and mole fraction or mole percent of $HfO_2$ relative to $ZrO_2$ in the respective solid solutions. Similarly, the mullite system of interest is the ceramic compositions having a continuous matrix phase of $3Al_2O_3.2SiO_2+x[3Cr_2O_3.2SiO_2]$ and a finely dispersed phase of $ZrO_2.yHfO_2$ where x and y again represent the relative mole fraction or mole percent of the $3Cr_2O_3.2SiO_2$ and $HfO_2$, respectively.

For purposes of this invention, the mole fraction or the mole percent, whether designated by x or y, refers to the relative mole fraction of the second component of a two component system wherein it is to be understood that the mole fraction (mole %) of the first component plus the x or y sums to unity; e.g., $ZrO_2.yHfO_2$ means $(1-y) ZrO_2.yHfO_2$.

In order to study and evaluate the high temperature properties of the above ceramic compositions, twenty-two compositions in the alumina system and ten compositions in the mullite system were prepared. In the alumina system the continuous matrix phase, $Al_2O_3.xCr_2O_3$, was present in 85 percent by volume and the dispersed phase, $ZrO_2.yHfO_2$, was present in 15 percent by volume; i.e. $(Al_2O_3.xCr_2O_3)$ plus 15 vol. % $(ZrO_2.yHfO_2)$. In the mullite system, the continuous matrix phase, $3Al_2O_3.2SiO_2+x[3Cr_2O_3.SiO_2]$, was present as the major phase and the dispersed phase, $ZrO_2.yHfO_2$, was present as the minor phase. In both systems, the relative mole fractions of both the chromium oxide component and the hafnium oxide component were varied such as to characterize a broad relative range of concentrations of each respective component. Thus, in the case of the alumina system, the twenty-two specimens were distributed as illustrated in TABLE I wherein two of the samples involved either no $HfO_2$ or no $ZrO_2$ (controls) and the remaining twenty involved compositions with all four oxides. Similarly, the x and y (relative mole fractions) of the mullite samples were intentionally distributed over a broad range of compositions with four additional specimens less one component being included as controls (as explained later in TABLE II).

TABLE I

COMPOSITIONS PREPARED IN THE ALUMINA SYSTEM: $(Al_2O_3.xCr_2O_3)$ + 15 vol. % $(ZrO_2.yHfO_2)$

| x, mole fraction of $Cr_2O_3$ in $Al_2O_3.xCr_2O_3$** | y, mole fraction of $HfO_2$ in $ZrO_2.yHfO_2$** | | | | | |
|---|---|---|---|---|---|---|
| | 0 | 0.1 | 0.2 | 0.3 | 0.5 | 1.0 |
| 0 | ¤ | | | | | * |
| .02 | | ¤ | ¤ | ¤ | * | |
| .05 | | ¤ | ¤ | ¤ | * | |
| .1 | | ¤ | ¤ | ¤ | * | |
| .2 | | ¤ | ¤ | ¤ | ¤ | |
| .3 | | ¤ | ¤ | ¤ | ¤ | |

**$Al_2O_3$ - Alcoa XA- 139
$Cr_2O_3$ - Reagent grade, J. T. Baker Chemical Company
$ZrO_2$ - Zircoa A
$HfO_2$ - 99.9% Apache Chemicals, Inc.

Specimens representative of both the alumina and mullite composition were prepared by hot pressing of mixtures of pre-solutionized powders. Hardness and fracture toughness were determined by the microhardness indentation method. Thermal conductivity of the respective specimens was determined by comparison with known standards. The following examples illustrate the preparation and composition of the specimens employed in the high temperature property evaluation.

EXAMPLE I

Five separate solid solutions of $Al_2O_3$-$Cr_2O_3$ having the mole fraction of $Cr_2O_3$ specified in the ordinate of TABLE I and the four separate solid solutions of $ZrO_2$-$HfO_2$ having the specified mole fraction of $HfO_2$ as found in the abscissa of TABLE I were prepared by mixing appropriate amounts of metal oxides in a ball mill and then reacting the mixture at 1350° C. for 24 hours. The metal oxides employed were from commercial sources as follows: $Al_2O_3$ was Alcoa XA-139; the $Cr_2O_3$ was Reagent Grade from J. T. Baker Chemical Company; $ZrO_2$ was Zircoa A and the $HfO_2$ was 99.9% $HfO_2$ from Apache Chemical Inc. The twenty-two compositions specified in TABLE I were prepared by adding 85 parts by volume of the $Al_2O_3.xCr_2O_3$ solutionized powder and 15 parts by volume of the $ZrO_2.yHfO_2$ solutionized powder and then ball milling the mixture for 43 hours. Specimens for microindentation tests were hot pressed at 1600° C. for one hour in boron nitride coated graphite dyes under a pressure of 30 $MN/m^2$. After hot pressing, the samples were then oxidized in air at 1350° C. for two hours. Specimens for thermal conductivity measurements were hot pressed at 1600° C. for one hour under a pressure of 15 $MN/m^2$. In both cases, full density was achieved.

EXAMPLE II

In order to evaluate the mullite system, $(3Al_2O_3 \cdot 2SiO_2 + x[3Cr_2O_3 \cdot SiO_2])\text{-}(ZrO_2 \cdot yHfO_2)$, a series of ten compositions and four controls as specified in TABLE II was prepared. Half of the compositions (type B in TABLE II) were prepared by a physical mixing or blending technique analogous to the process described in EXAMPLE I. The other half of the compositions were prepared by a co-precipitation technique (type C in TABLE II). Appropirate stoichiometric amounts of aluminum hydroxide, silicic acid and chromic acid were used as starting materials for the acid/base neutralization reaction used to prepare the mullite solid solutions. Oxide powders were used to prepare the $ZrO_2\text{-}HfO_2$ solid solutions, again in a manner described in EXAMPLE I. Weighed powders were mixed in proportions corresponding to TABLE II and ball milled for seventy-two hours. In the co-precipitated compositions, the slurries corresponding to the compositional properties of TABLE II were dried and hot pressed at 1550° C. for 30 minutes at a pressure of 30 MN/m². The hot pressing (HP) and the annealing (Ann.) of the specimens was otherwise as specified in TABLE II.

TABLE II

| Mole % of M Cr HfO$_2$ | Type | HP | Ann. | Relative Amount of Phases | | | | | K$_{IC}$ | H$_v$ |
|---|---|---|---|---|---|---|---|---|---|---|
| | | | | Mullite | ZrO$_2$ | (Zr.Hf)O$_2$ | (Zr.Hf)SiO$_4$ | Cadmium | (MPa · m) | (kg/mm²) |
| M-0-0 | B | 1600° C. 1 hr | 1350° C. 24 hrs | 100 | 17.6 | | | | 2.18 | 1259 |
| | C | 1500° C. 30 min | 1500° C. 1 hr | 100 | 17.6 | | | | 2.43 | 1180 |
| M-0-10 | B | 1600° C. 1 hr | 1250° C. 24 hrs | 100 | | 20.6 | 1.1 | | 2.08 | 1207 |
| | C | 1500° C. 30 min | 1500° C. 1 hr | 100 | | 43.0 | | | 2.35 | 1217 |
| M-0-20 | B | 1600° C. 1 hr | | 100 | | 23.6 | 7.0 | | 1.63 | 1178 |
| | C | 1500° C. 30 min | 1500° C. 1 hr | 100 | | 28.8 | 5.3 | 4.1 | | |
| M-5-0 | B | 1600° C. 1 hr | | 100 | 23.5 | | 1.3 | 1.1 | 2.43 | 1112 |
| | C | 1300° C. 30 min | 1500° C. 1 hr | 100 | 16.6 | | | 1.2 | 2.37 | 989 |
| M-5-10 | B | 1600° C. 1 hr | 1350° C. 24 hrs | 100 | | 23.6 | 2.8 | | 1.94 | 1070 |
| | C | 1500° C. 30 min | 1500° C. 1 hr | 100 | | 30.7 | | 4.1 | 2.76 | 1083 |
| M-5-20 | B | 1600° C. 1 hr | 1550° C. 2 hrs | 100 | | 30.5 | 4.2 | 0.7 | 1.70 | 1062 |
| | C | 1500° C. 30 min | 1500°0 C. 1 hr | 100 | | 30.5 | | 3.2 | 2.76 | 1219 |
| M-5-30 | B | 1600° C. 1 hr | 1350° C. 24 hrs | 100 | | 30 | 5.8 | | 1.36 | 1118 |
| | C | 1500° C. 30 min | 1500° C. 1 hr | 100 | | 38.8 | | 4.2 | 3.20 | 1247 |

With respect to measuring and evaluating the high temperature properties of the ceramic compositions of EXAMPLES I and II, the microindentation technique was used to determine relative fracture toughness and absolute hardness. A Tukon microhardness testing machine was used for microhardness and indentation-fracture toughening studies. A minimum of five indentations were made at each of the five or more different loads for each sample. The loads varied from 2 kg to 15.9 kg depending on specimen composition. A Vickers diamond indentor (136°) was used in all studies. The following equation (1) developed by Anstis et al (for further explanation see "A Critical Evaluation of Indentation Techniques for Measuring Fracture Toughness: I. Direct Crack Measurements," J. Am. Ceram. Soc. 64 (9) 33-8 (1981)) was used to calculate these two material properties.

$$\text{constant} = K_{IC}(H/E)^{1/2}/(P/c^{3/2}) \quad (1)$$

The above equation relates a material independent constant to the fracture toughness, hardness, elastic modulus, crack size and applied load. According to this equation, the $c^{3/2}$ versus P plot where c is the crack length and P is the applied load should yield a straight line with a slope equal to:

$$\text{slope} = \text{constant}\,(E/H)^{1/2}/K_{IC} \quad (2)$$

By rearranging the above equation and solving for fracture toughness, the following is calculated:

$$K_{IC} = \text{constant}\,(E/H)^{1/2}/\text{slope} \quad (3)$$

The hardness was determined from the $a^2$ versus P curve where a is one half of the diagonal of the indentation. From Hucke's work ("Process Development for Silicon Carbide Base Structural Ceramics", Report DAAG 46-80-C-0056-P0004, June, 1982, AMMRC, Watertown, Mass.), this hardness, $H_v$, is independent of load and is the hardness at large loads. The equation used to calculate this value is:

$$H_v = k/s' \quad (4)$$

where k is a proportionality constant for a Vickers diamond indentor (136°) and is equal in this case to 4,636. The slope, s', is determined from the $a^2$ versus P curve. The value of the constant in equation (4) is of little significance since a standard (NC203) was used to make all the calculations.

To determine $K_{IC}$, the value of the elastic modulus, E, for the composition being measured must be available or determined. For the alumina system, the literature value of the elastic modulus for $Al_2O_3$ of $60 \times 10^6$ psi was used (see Engineering Property Data on Selected Ceramics, Vol. III, Single Oxides, MCIC-HB-07, Metal and Ceramics Information Center, Battelle, Columbus, Ohio). It was assumed that this value was constant and characteristic of all alumina compositions employed. For the mullite system a value of $25 \times 10^6$ psi was used. This value is intermediate between two values, 21 and $32 \times 10^6$ psi, reported in literature. (See Van Vlack, L.H., Elements of Material Science, Addison-Wesley, Reading, Mass., pf. 5.4.1-22 and Matdigasmi, K. S., and Brown, L. M., "Synthesis in Mechanical Properties of Stoichiometric Alumin Silicate (Mullite), J. Am. Ceram. Soc. 55 (11) 548–552 (1972)).

Figure 2:
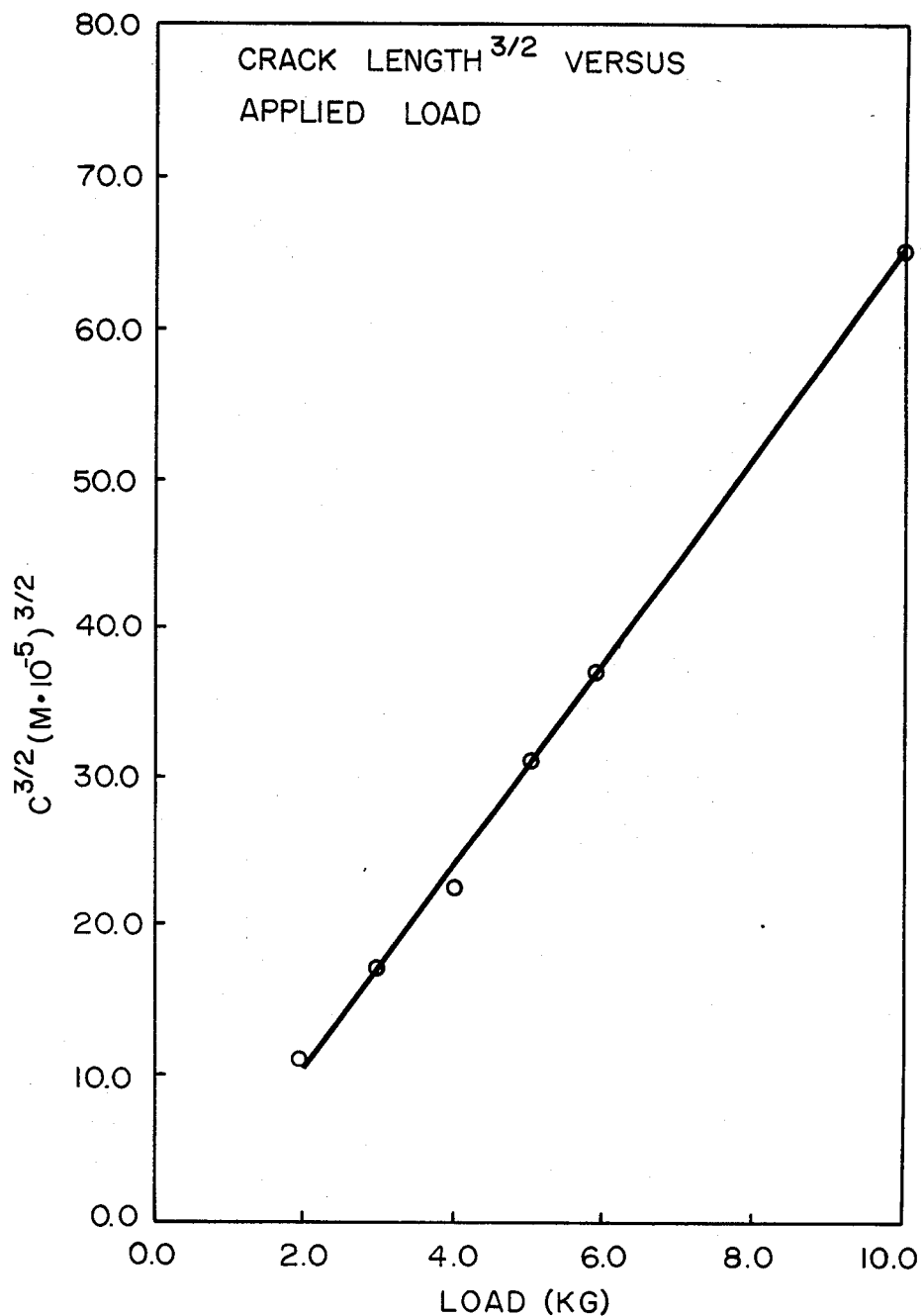
FIG. 2 is a typical plot of the crack length of the three halves power, $c^{3/2}$, versus the applied load, P, used to valuate the fracture toughness, $K_{IC}$, of a ceramic composition according to the present invention.
Figure 3:
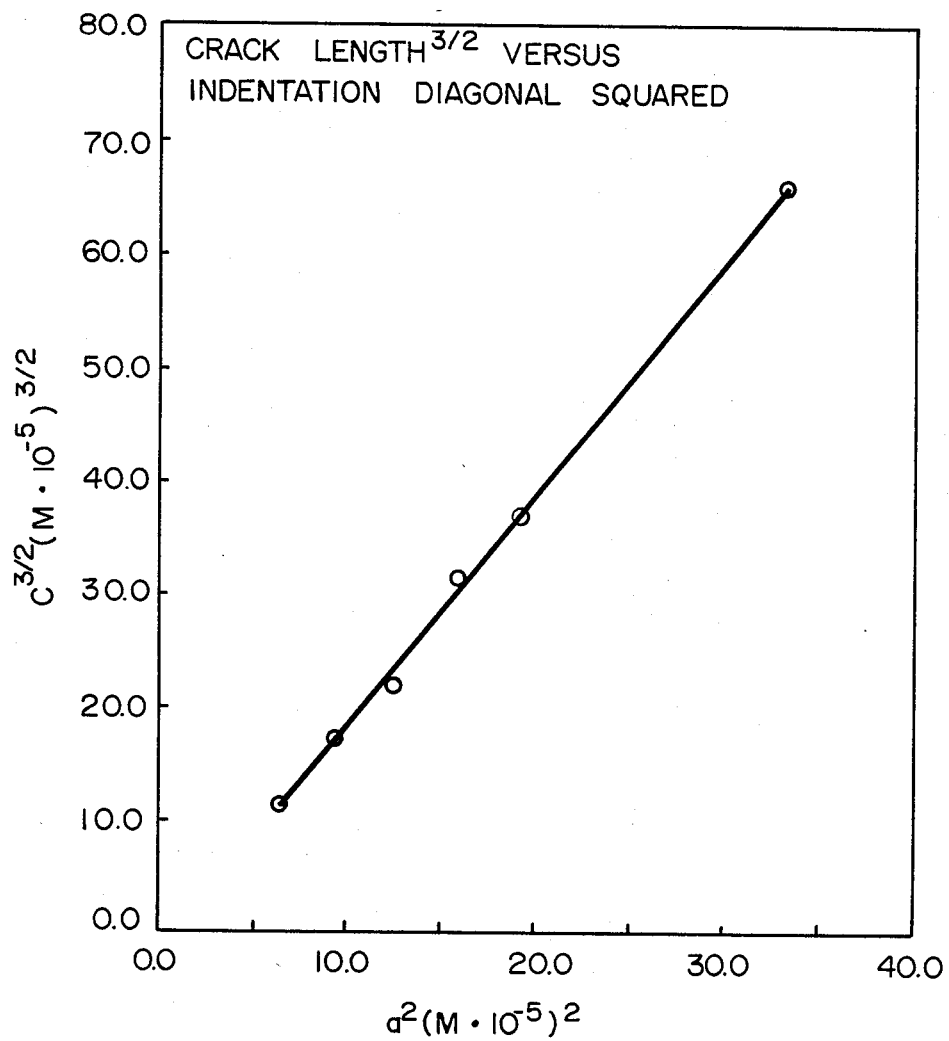
FIG. 3 is a typical linear plot of the crack length to the three halves power, $c^{3/2}$, versus the indentation diagonal squared, $a^2$, characteristic of a ceramic composition according to the present invention.

Plots of $a^2$ versus P and $c^{3/2}$ versus P curves were constructed for all indentation test data generated. The degree of linear fit was excellent, $r^2=0.99$, for all $a^2$ versus P curves. The linear fit was good, for most tests $r^2$ was at least 0.97, for the $c^{3/2}$ versus P. Curves. FIGS. 1 through 3 of the drawings illustrate typical $a^2$ versus P, $c^{3/2}$ versus P, and $c^{3/2}$ versus $a^2$ curves generated by plotting the respective data characteristic of compositions according to the present invention. As clearly indicated in FIGS. 1 through 3, the experimentally measured data is essentially linear across the entire range of interest consistent with the nature of the above equations.

Figure 4:
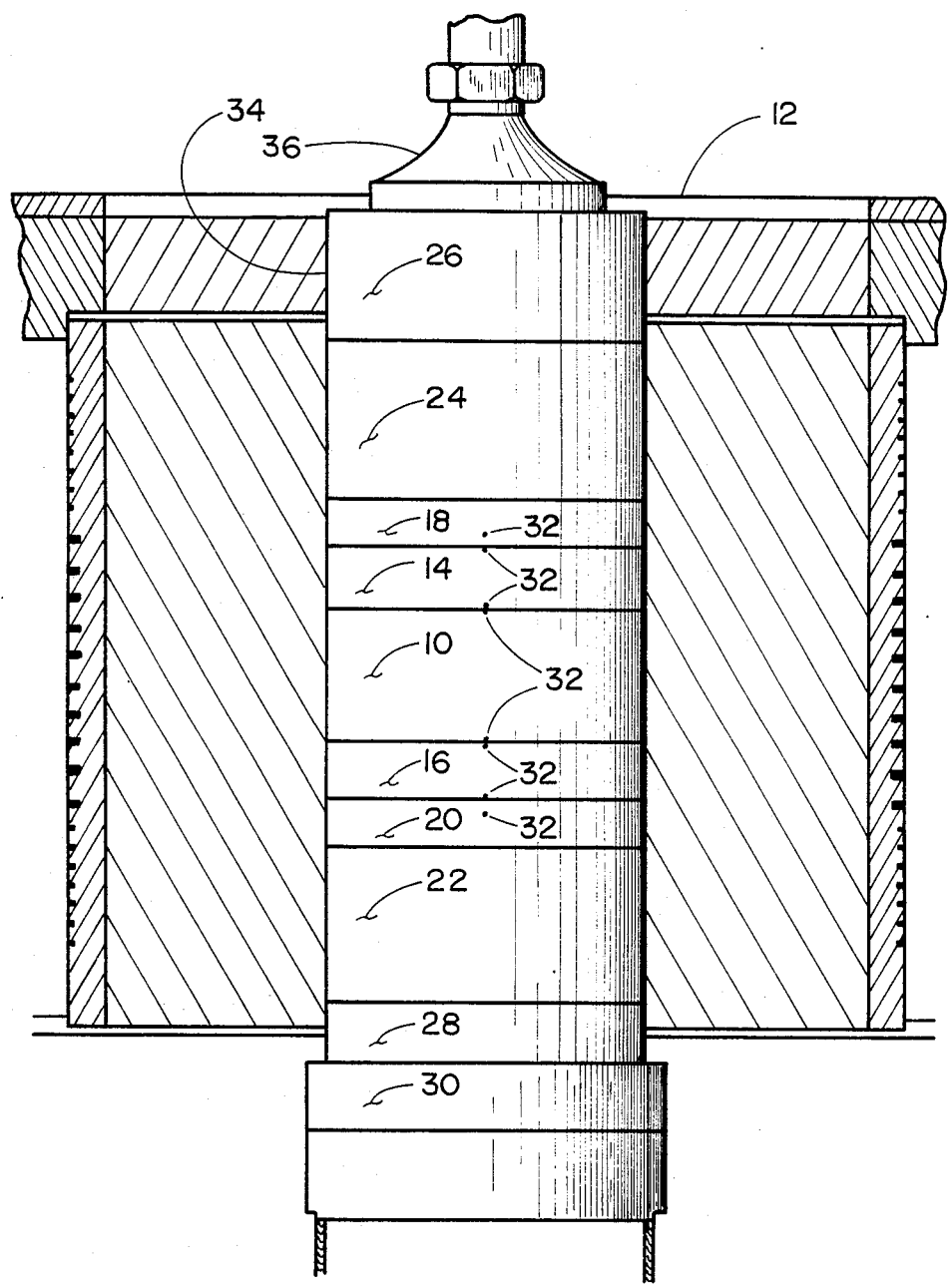
FIG. 4 is a cross sectional view of a thermal conductivity specimen cell used to measure high temperature thermal conductivity of ceramic composition according to the present invention.
Figure 5:
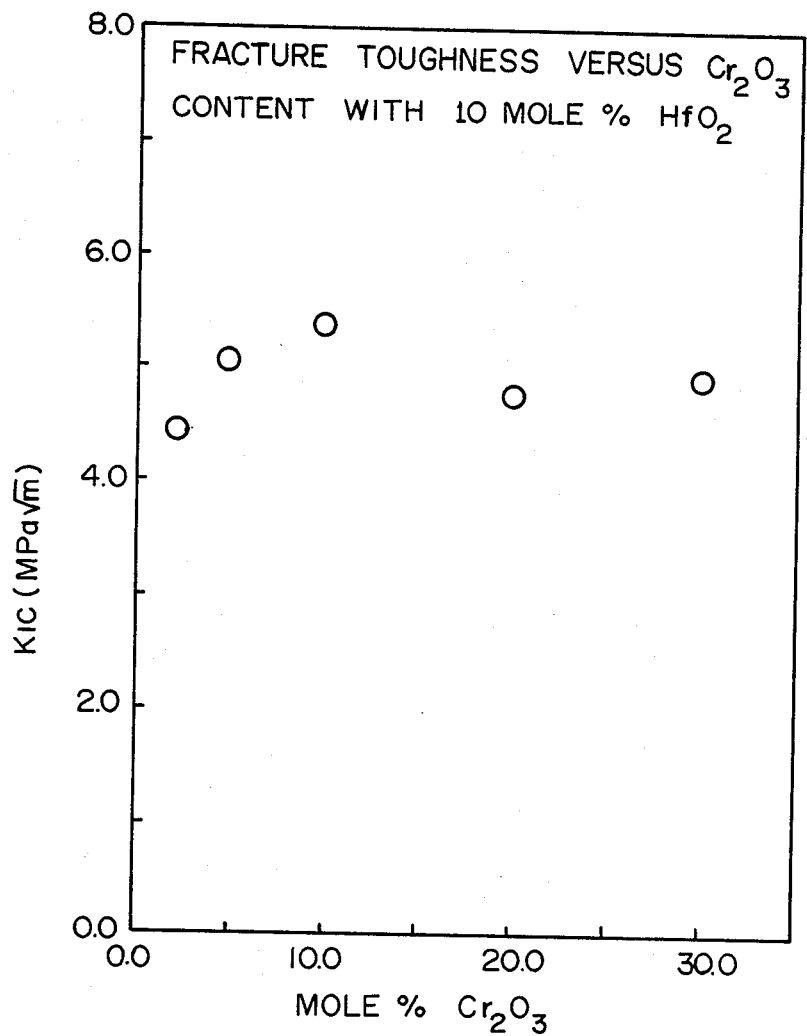
FIGS. 5 through 12 illustrate experimental data plots using identation test data measured for the $(Al_2O_3.xCr_2O_3)$-15 vol. % $(CrO_2.yHfO_2)$ ceramic compositions according to the present invention.
Figure 6:
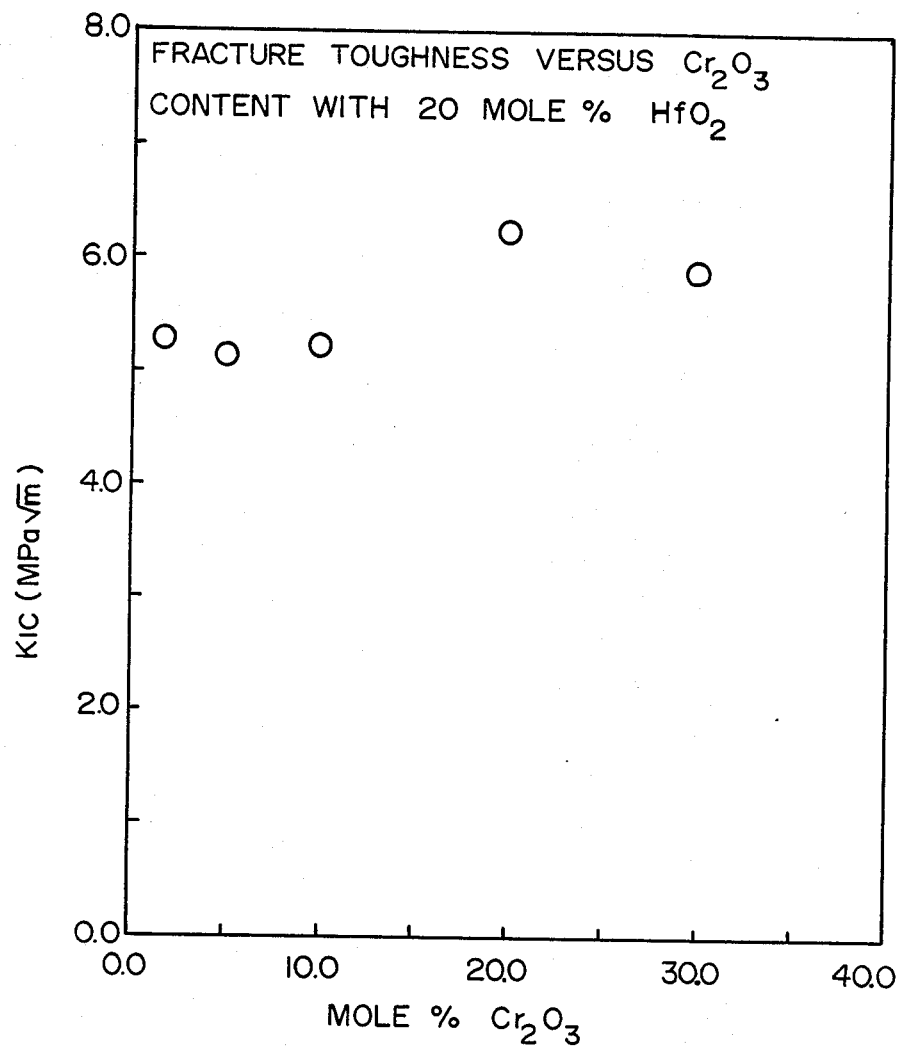
Figure 7:
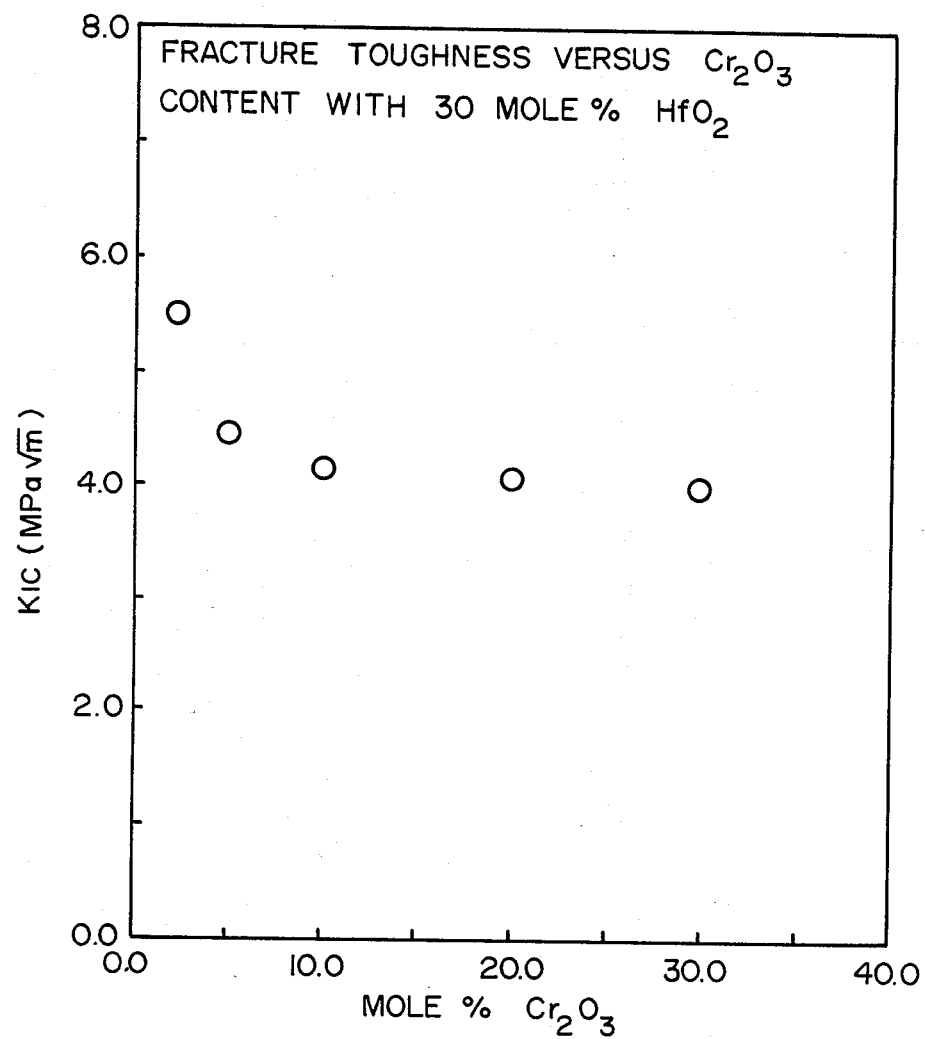
Figure 8:
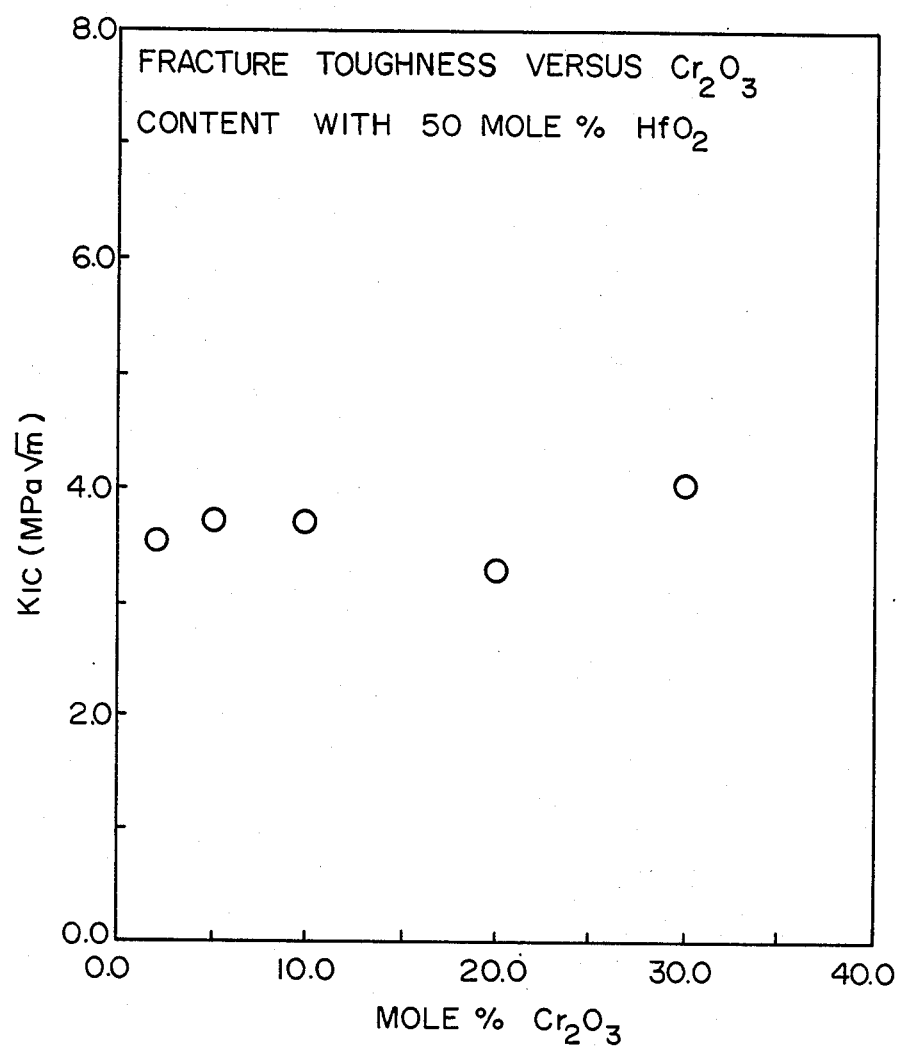
Figure 9:
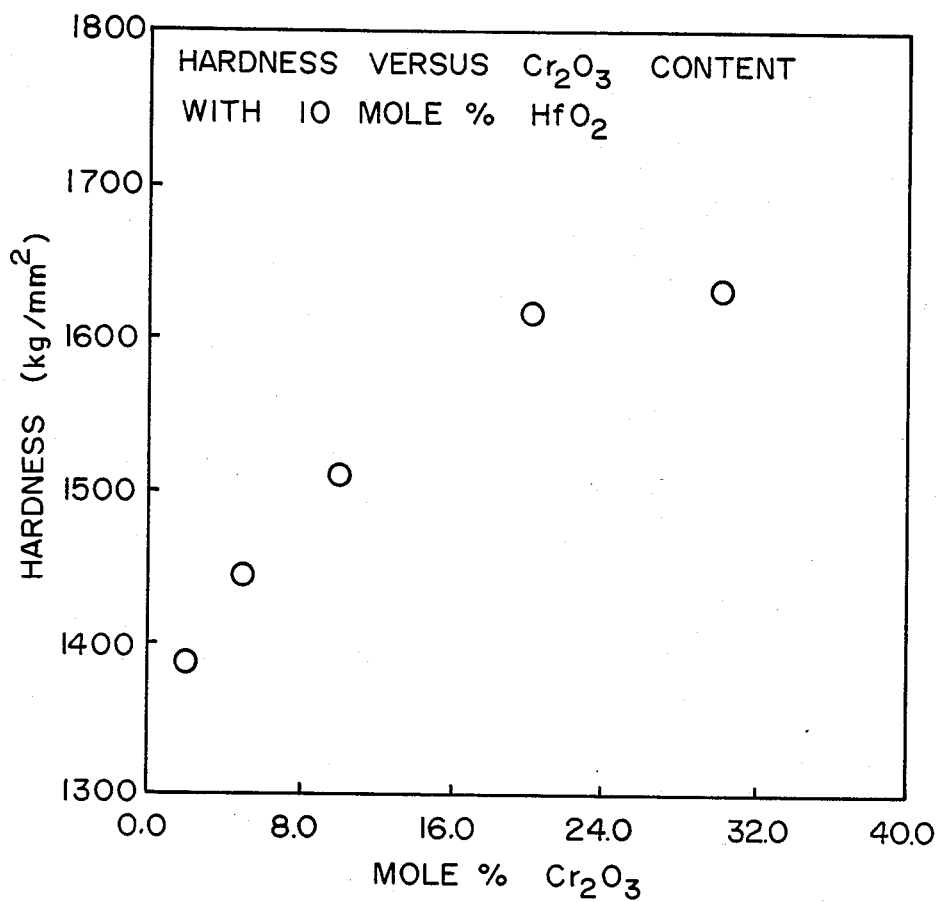
Figure 10:
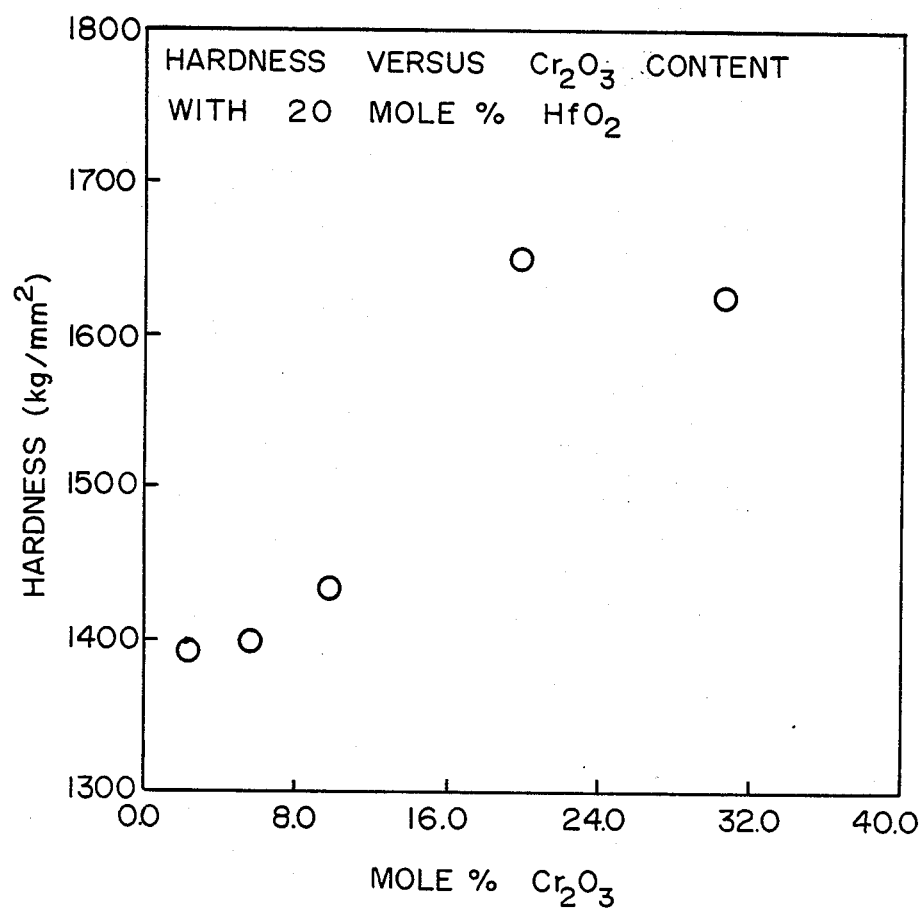
Figure 11:
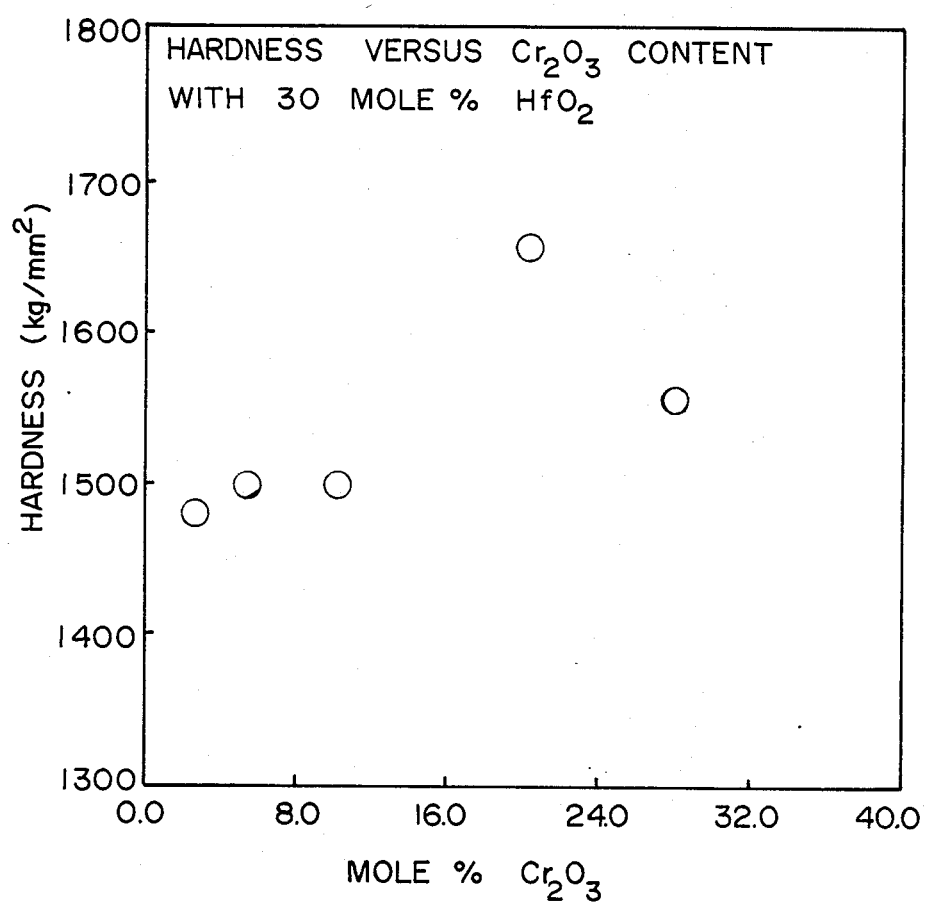
Figure 12:
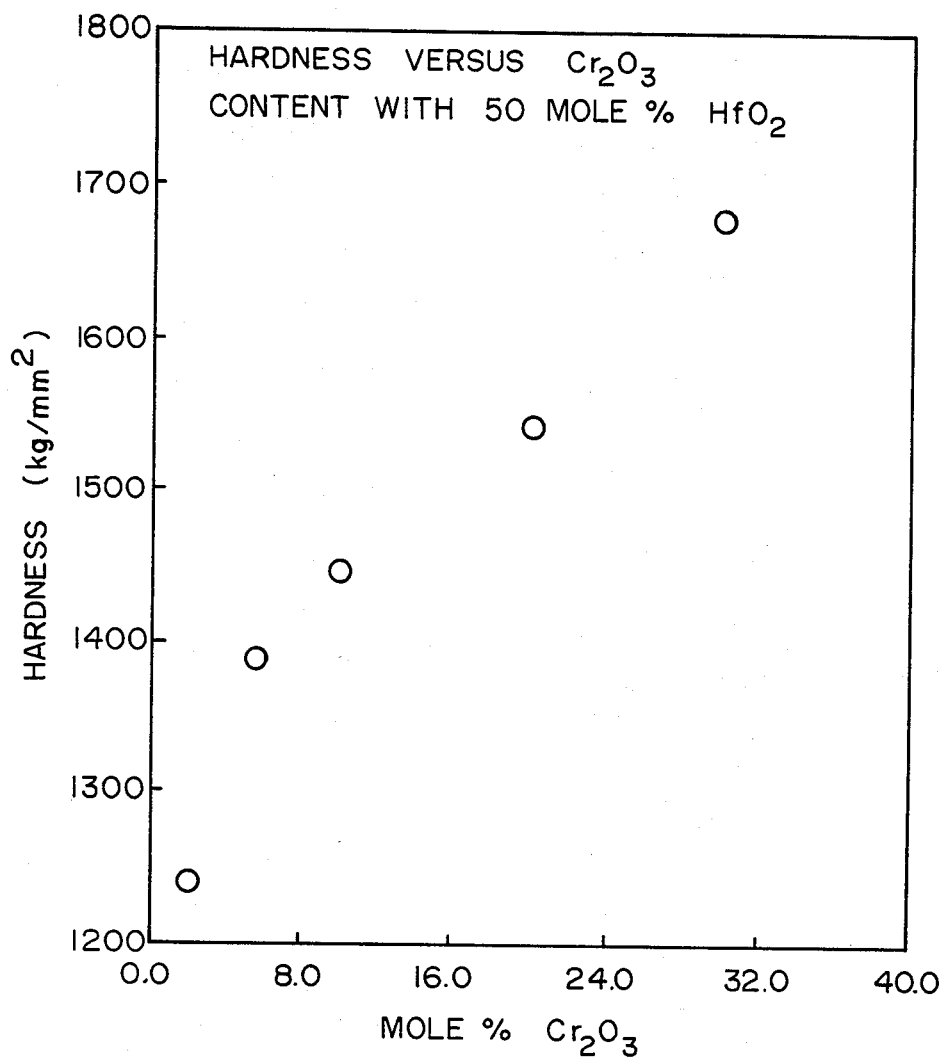
Figure 13:
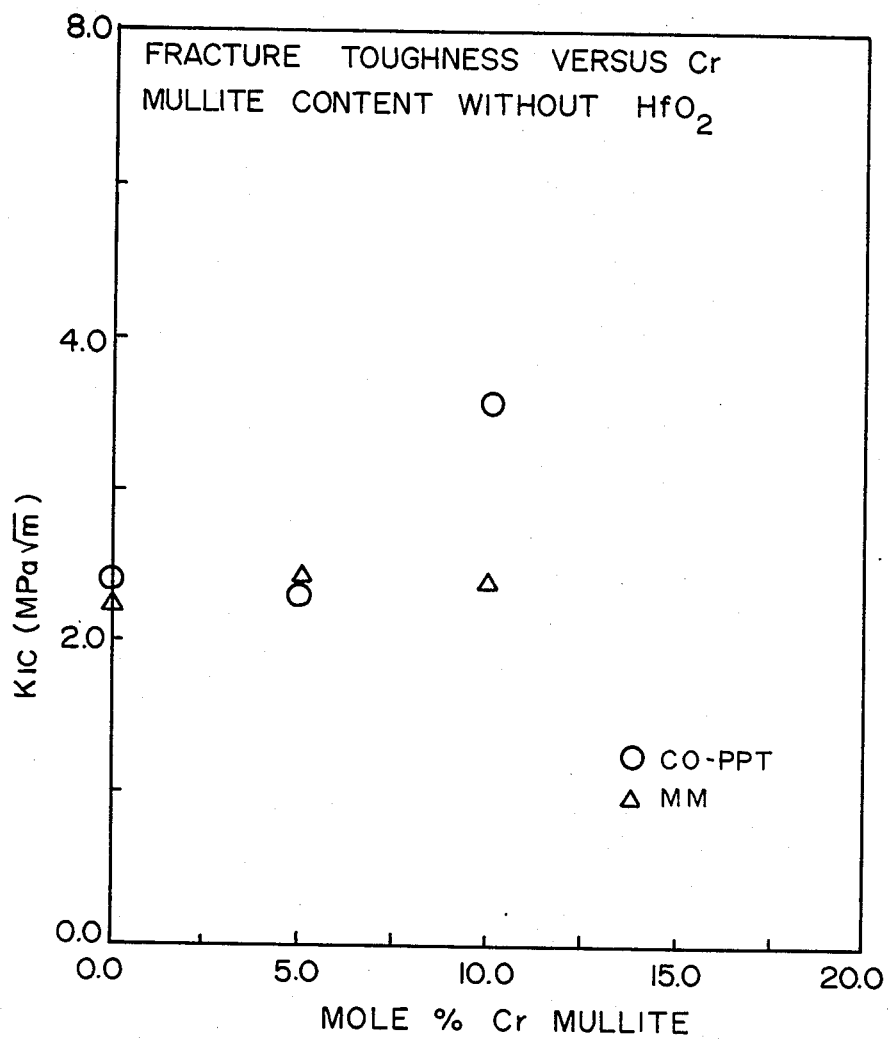
FIGS. 13 through 18 illustrate experimental data plots using indentation test data measured for the $(3Al_2O_3.2SiO_2+x[3Cr_2O_3.2SiO_2])$-$(ZrO_2.yHfO_2)$ ceramic compositions according to the present invention.
Figure 14:
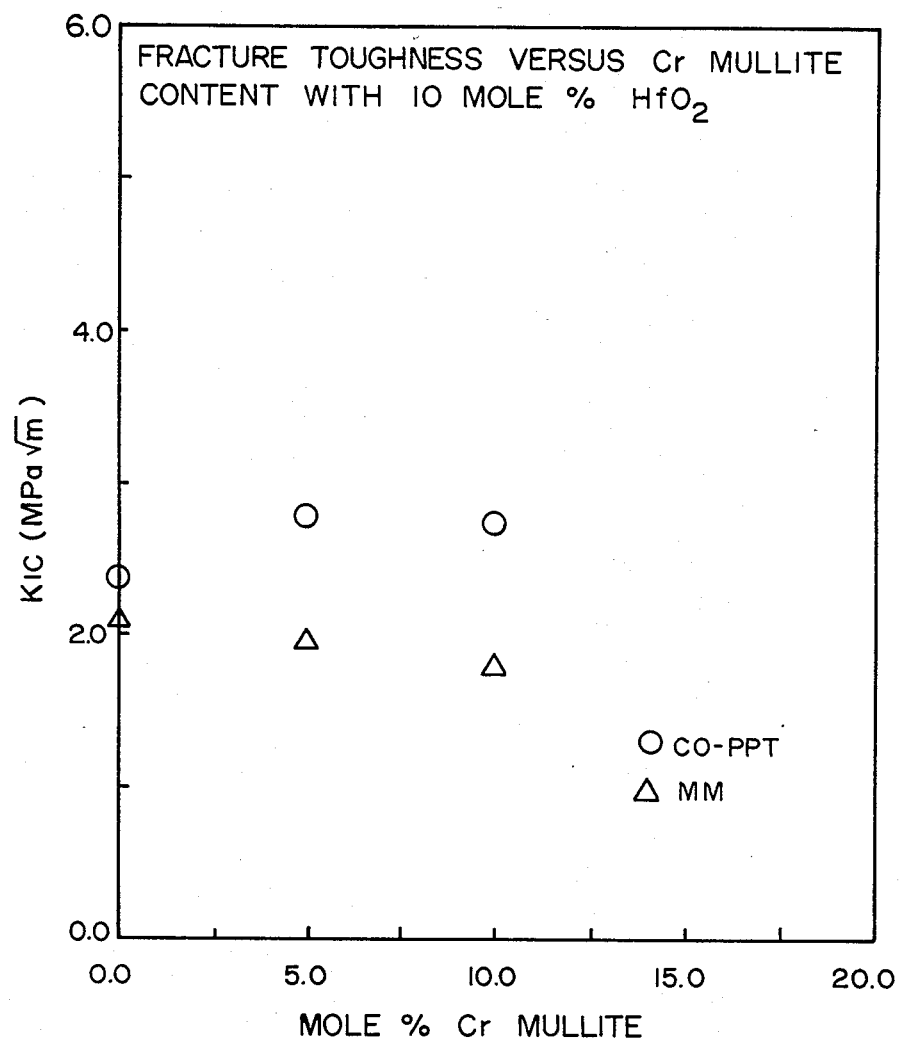
Figure 15:
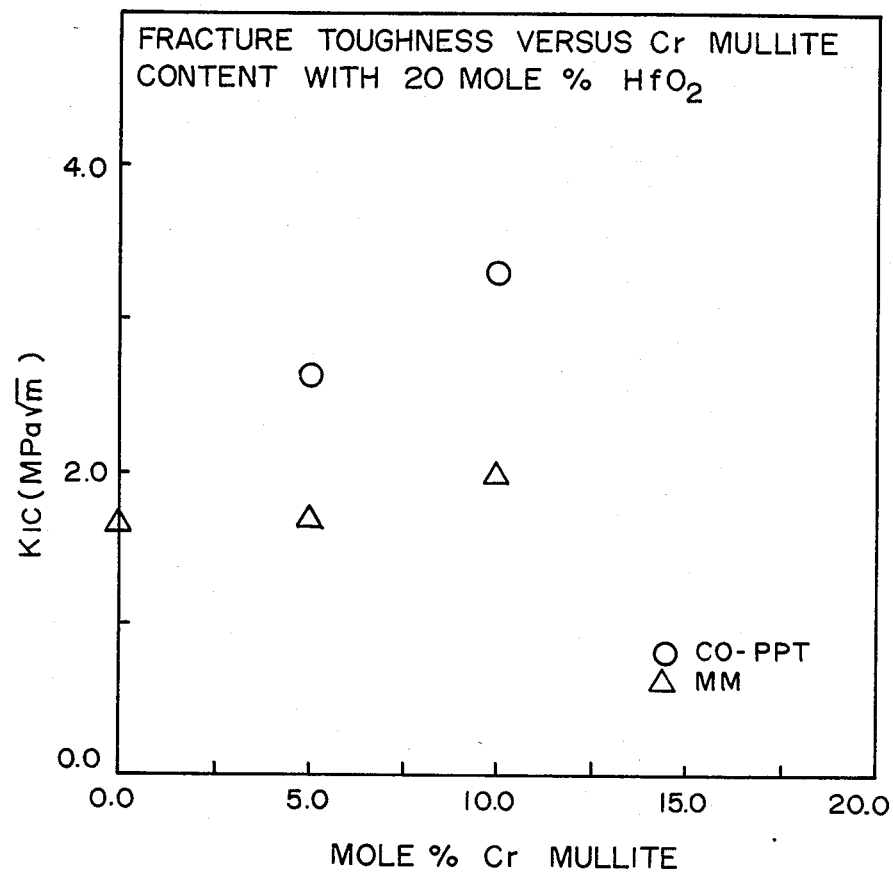

The thermal conductivity measurements of compositions according to the present invention were performed by a comparative method. As illustrated in FIG. 4, the method involved the use of a commercially available comparative thermal conductivity instrument manufactured by Dynatech Corporation (Model TCFCM). The comparative measurement involved placing test specimen 10 to be measured within the Model TCFCM 12 such that it is stacked between a top reference standard specimen 14 and a bottom reference standard 16. As further illustrated in FIG. 4, the stack of specimens is sandwiched between an upper surface plate 18 and a lower surface plate 20 which in turn rest on auxiliary heater 22 and is capped by a main heater 24. The top heater 24 in turn is covered by insulation, while the auxiliary heater 22 rests on a spacer 28 and heat sink 30. A plurality of thermocouples 32 are stategically positioned within the sample cavity 34 at critical interfaces, such as to make temperature measurements while pressure pad 36 compresses the stack of specimens.

The actual measurement and computation of the thermal conductivity is defined by the following equation:

$$q = kA(dT/dx) \quad (5)$$

where q is heat flux, A is the specimen cross section area, T is temperature, x is distance tween two points in the sample and k is the desired thermal conductivity. When the specimens with the same A of two different materials are arranged as shown in FIG. 4 then:

$$T(k/\Delta x)_{sample} = \Delta T(k/\Delta x)_{reference} \quad (6)$$

Thus, by measuring the temperature difference between two thermocouples at a distance x apart in both reference materials and te test sample, the thermal conductivity of the test material can be evaluated.

FIGS. 5 through 12 graphically present and summarize the results of the indentation tests on the alumina system compositions of EXAMPLE I as specifically set out in TABLE II. The twenty-two alumina compositions measured contained about 2 to about 30 mole percent $Cr_2O_3$ in the alumina/chromium solid solution matrix and from 0 to about 50 mole percent $HfO_2$ in the zirconia/hafnium dioxide dispersed solid solution particles. As illsutrated in FIGS. 5 through 8 and as presented in TABLE III, the measured fracture toughness generally decreased with increasing $HfO_2$ content at constant $Cr_2O_3$ content. This may be attributed to the decrease in the critical particle size of the tetragonal-monoclinic phase transition with increasing $HfO_2$ content. However, it has not been verified that the particle size of the dispersed $ZrO_2$-$HfO_2$ solid solution phase in any of the samples was small enough to retain the tetragonal phase (as further discussed below).

TABLE III

| SAMPLE ($Al_2O_3$·x$Cr_2O_3$)- 15 vol % ($ZrO_2$·y$HfO_2$) | | THERMAL CONDUCTIVITY $k = q/A.(dt/dx)$ (cal/cm.°C.·sec) | | |
|---|---|---|---|---|
| x | y | 70° C. | 250° C. | 400° C. |
| 0 | 100 | 0.0399 | 0.219 | 0.0156 |
| 0 | 0 | 0.0273 | 0.0177 | 0.0137 |
| 2 | 10 | 0.0378 | 0.0240 | 0.182 |
| 2 | 20 | 0.0332 | 0.0180 | 0.0132 |
| 2 | 30 | 0.0348 | 0.0179 | 0.0120 |
| 2 | 50 | 0.0292 | 0.0197 | 0.0147 |
| 5 | 10 | | | |
| 5 | 20 | 0.0274 | 0.0174 | 0.0133 |
| 5 | 30 | 0.0277 | 0.0164 | 0.0121 |
| 5 | 50 | 0.0274 | 0.0165 | 0.0127 |
| 10 | 10 | 0.0165 | 0.0125 | 0.0108 |
| 10 | 20 | 0.0241 | 0.0170 | 0.0138 |
| 10 | 30 | 0.0229 | 0.0144 | 0.0108 |
| 10 | 50 | 0.0233 | 0.0152 | 0.0118 |
| 20 | 10 | 0.0153 | 0.0105 | 0.0082 |
| 20 | 20 | 0.0179 | 0.0121 | 0.0094 |
| 20 | 30 | 0.0188 | 0.0137 | 0.0111 |
| 20 | 50 | 0.0191 | 0.0138 | 0.0110 |
| 30 | 10 | 0.0168 | 0.0122 | 0.0099 |
| 30 | 20 | 0.0156 | 0.0113 | 0.0093 |
| 30 | 30 | 0.0178 | 0.0139 | 0.0119 |

FIGS. 9 through 12 and TABLE III illustrate that for constant $HfO_2$ contents of 10, 20 and 50 mole percent there appears to be a shift in the peak of the fracture toughness, $K_{IC}$, versus $Cr_2O_3$ content curve. The peaks appear at 10, 20 and 30 mole percent $Cr_2O_3$ content, respectively. The fracture toughness continually decreased with increasing $Cr_2O_3$ content with the effect of the $HfO_2$ content on the hardness being less discernible. Generally, the hardness stayed fairly constnt with increasing $HfO_2$ content and constant $Cr_2O_3$ content.

The average particle size for the dispersed $ZrO_2$-$HfO_2$ phase in most of the above specimens was of the order of 5 μm. This is felt to be too large to effectively retain the metastable tetragonal phase which, as previously indicated, mechanistically is thought to produce an increase in fracture toughness due to a stress-induced phase transformation of even greater significance than the originally observed phenomena associated with PSZ. In this respect, the time-stabilized zirconia and the associated high energy absorbing tetragonal to monoclinic transition beneficial effects may not be fully realized (a feature which from a particle size analysis should be kept in mind when evaluating the coprecipitation versus ball milled specimens of EXAMPLE II). In interpreting the above experimental data and property measurements, it should also kept in mind that using a constant modulus value, E, for all compositions will introduce some error in the calculated fracture toughness value. Although present, this error is felt to be small.

In view of the above data, the transformation toughened ceramic alloys involving twenty percent $Cr_2O_3$-

10% HfO$_2$ and/or 20% Cr$_2$O$_3$-20% HfO$_2$ having a relatively high Cr$_2$O$_3$ content should exhibit significantly increased hardness and modulus. Further, high HfO$_2$ content (e.g. 50 mole %) should significantly increase the transformation temperature and thus, increase the potential for transformation toughening. For the same reason, the critical particle size for transformation is preferably decreased. To achieve a reasonable increase in the toughening and keep the critical particle size within pragmatic limits, intermediate values of HfO$_2$ (e.g., about 10 to about 20 mole %) in the dispersed solid solution phase are preferred.

FIGS. 13 through 18 graphically display and summarize the results of the indentation tests on the mullite system of EXAMPLE II as specifically found in the far right columns of data of TABLE II. Again, the figures illustrate and suggest certain general trends in the data. For example, FIGS. 13 through 15 suggest that for the co-precipitated samples, keeping HfO$_2$ constant and increasing the Cr mullite content, results in an increase in the fracture toughness; while, the effect of a change in the HfO$_2$ content on fracture toughness is more obscure. Similarly, for mechanically mixed samples, an increase in HfO$_2$ content generally results in a decrease in fracture toughness at constant Cr mullite content. With no HfO$_2$ the fracture toughness remains constant while increasing the Cr mullite content. In all cases except one, for the same composition, the fracture toughness of the coprecipitated samples was greater than the fracture toughness of the mechanically mixed samples. This may be due to the difference in hot pressing conditions and/or subsequent particle size and distribution.

Figure 16:
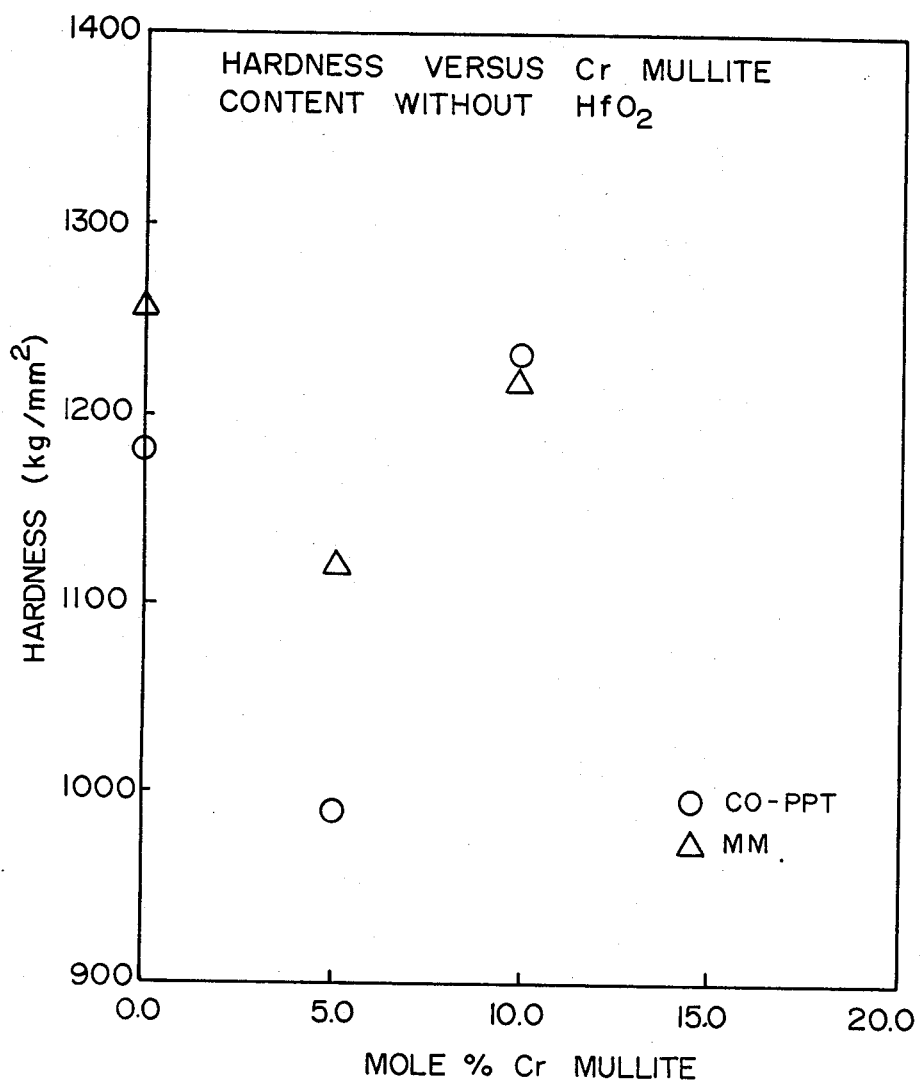
Figure 17:
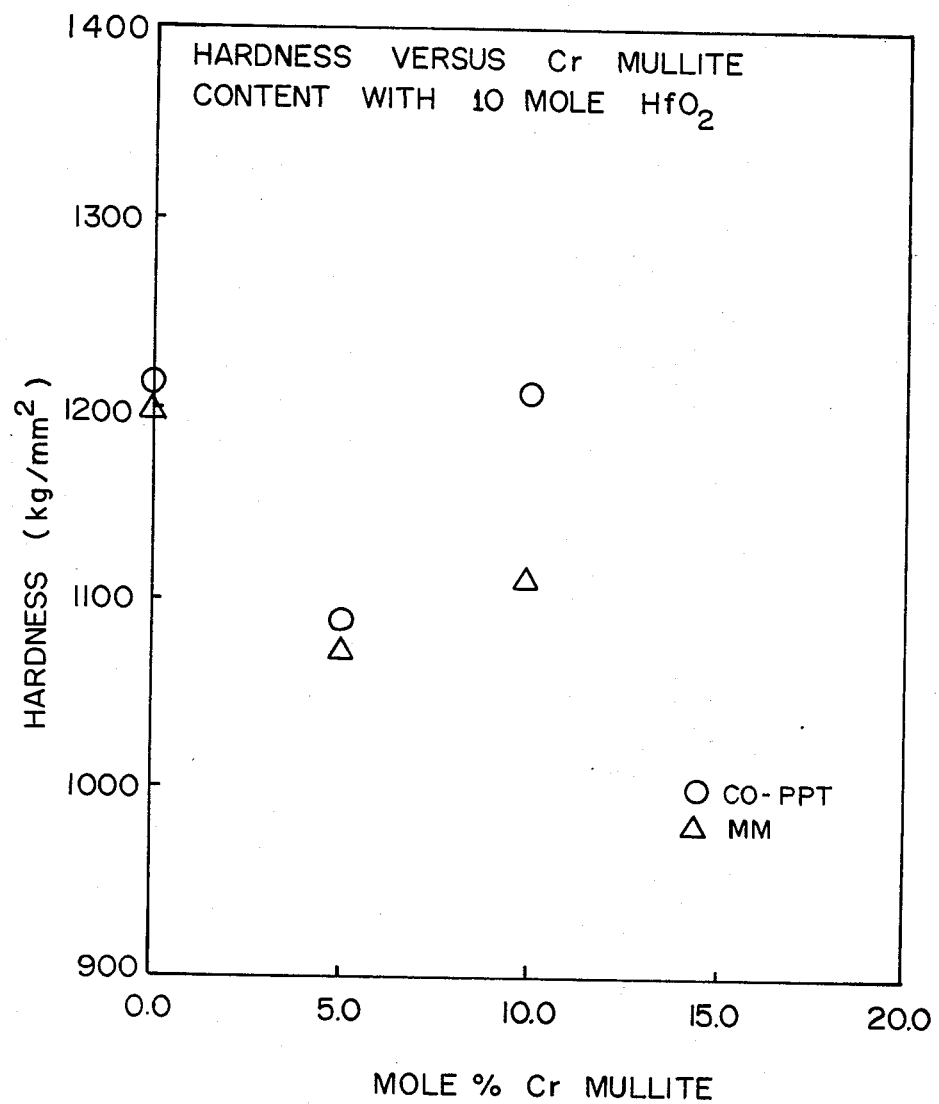
Figure 18:
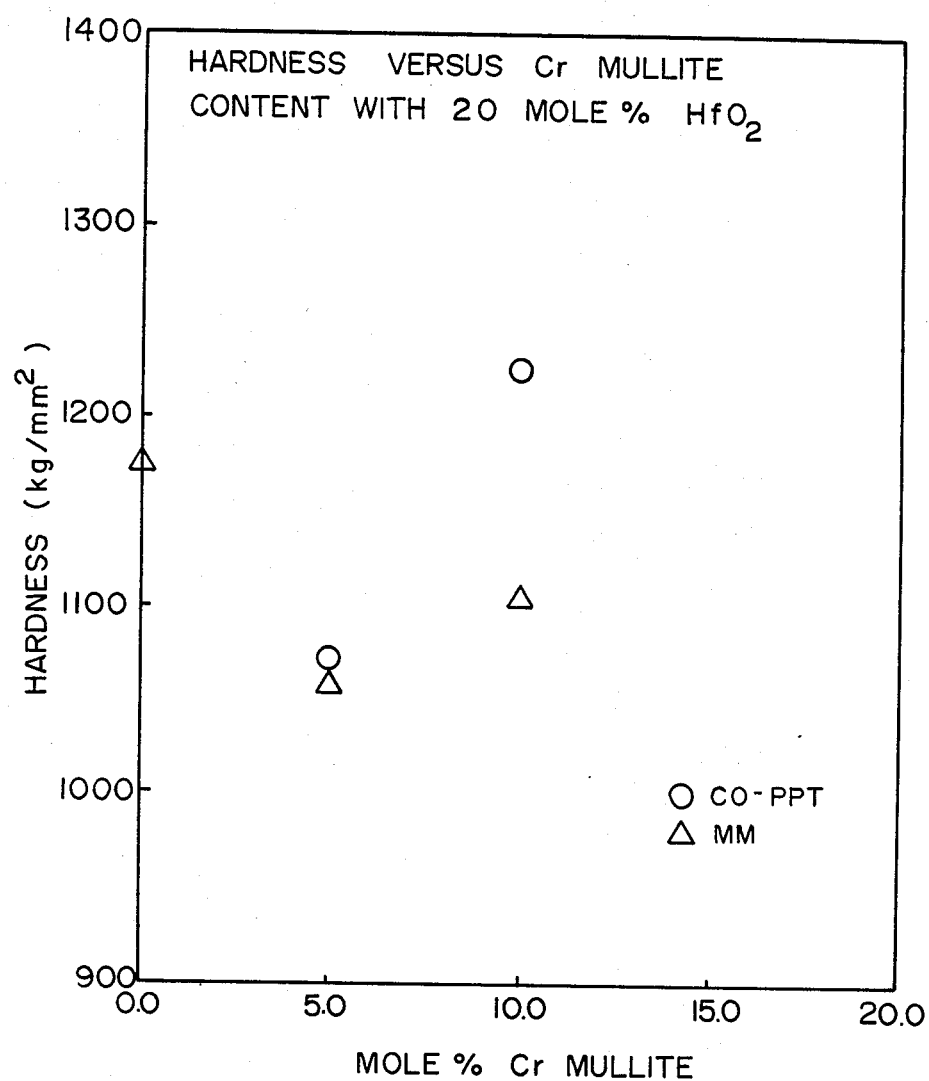
Figure 19:
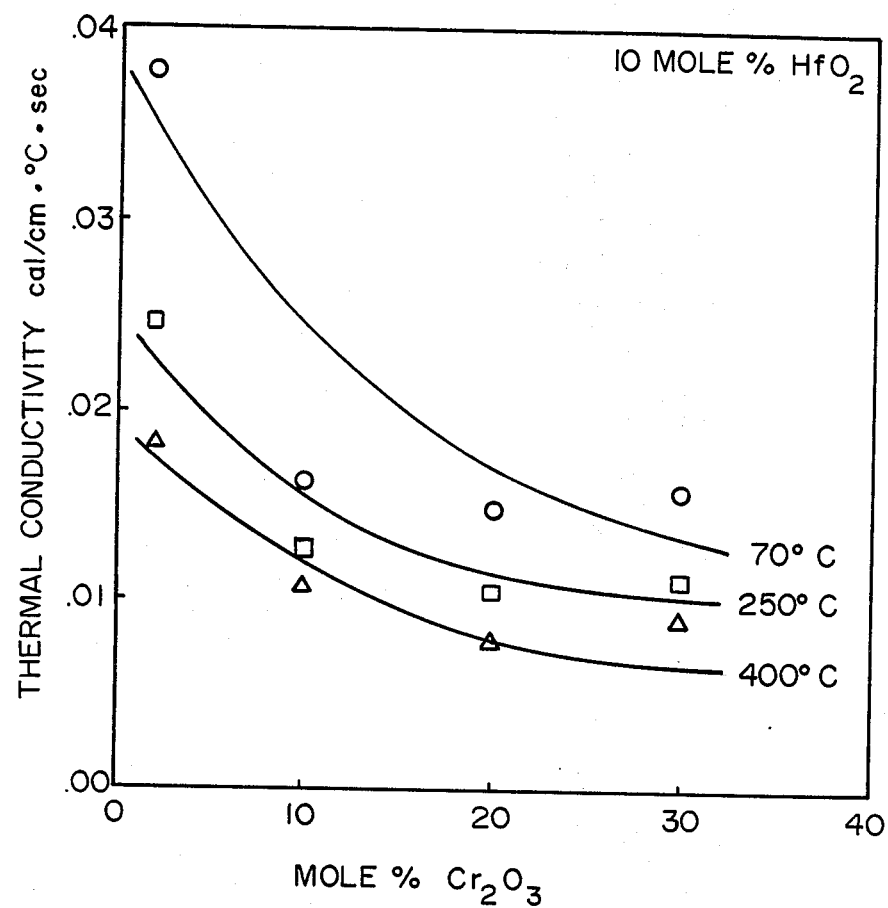
FIGS. 19 through 23 illustrate experimental data plots using thermal conductivity data measured for compositions of FIGS. 5 through 12.
Figure 20:
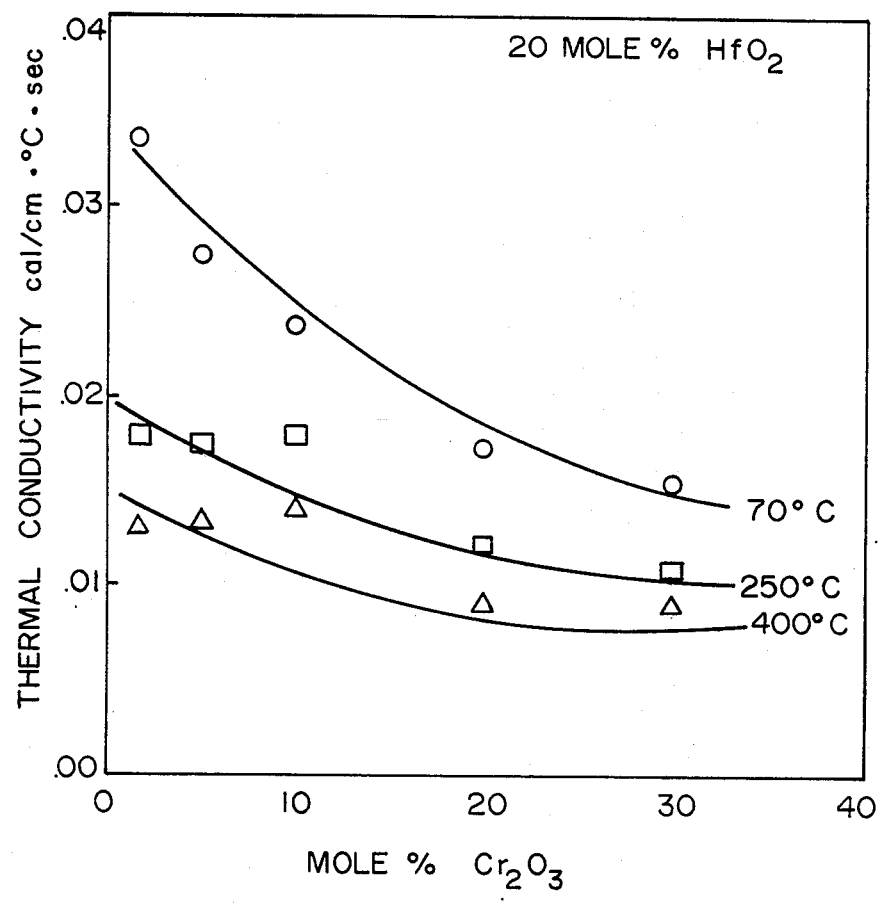
Figure 21:
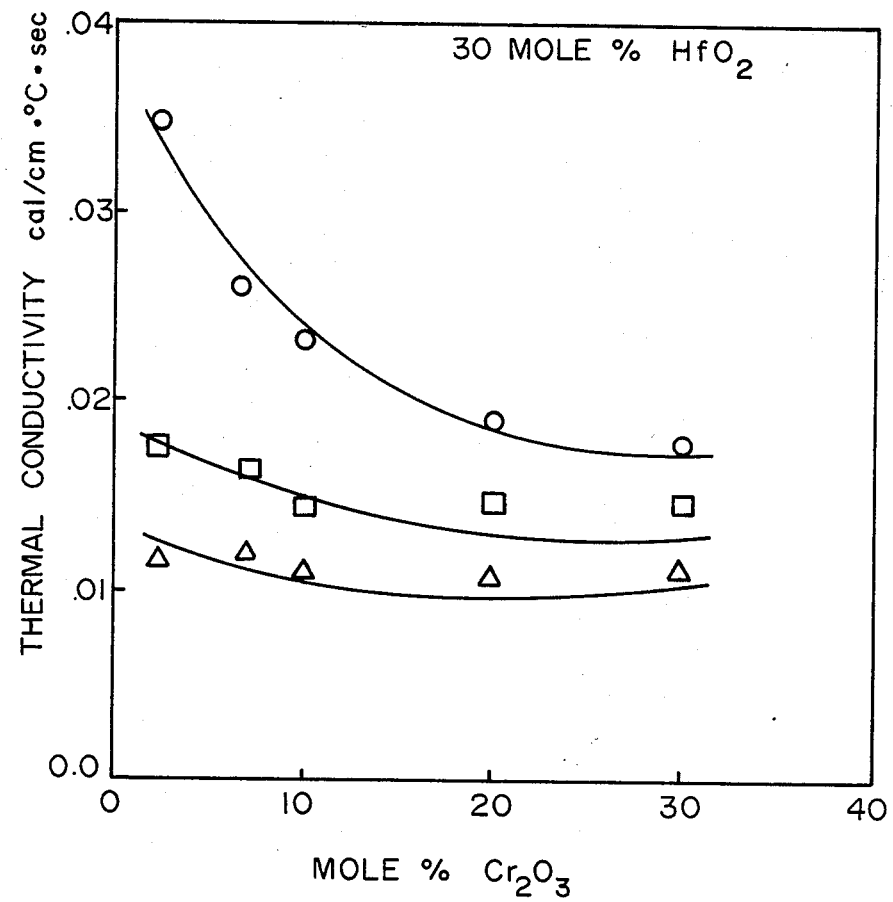
Figure 22:
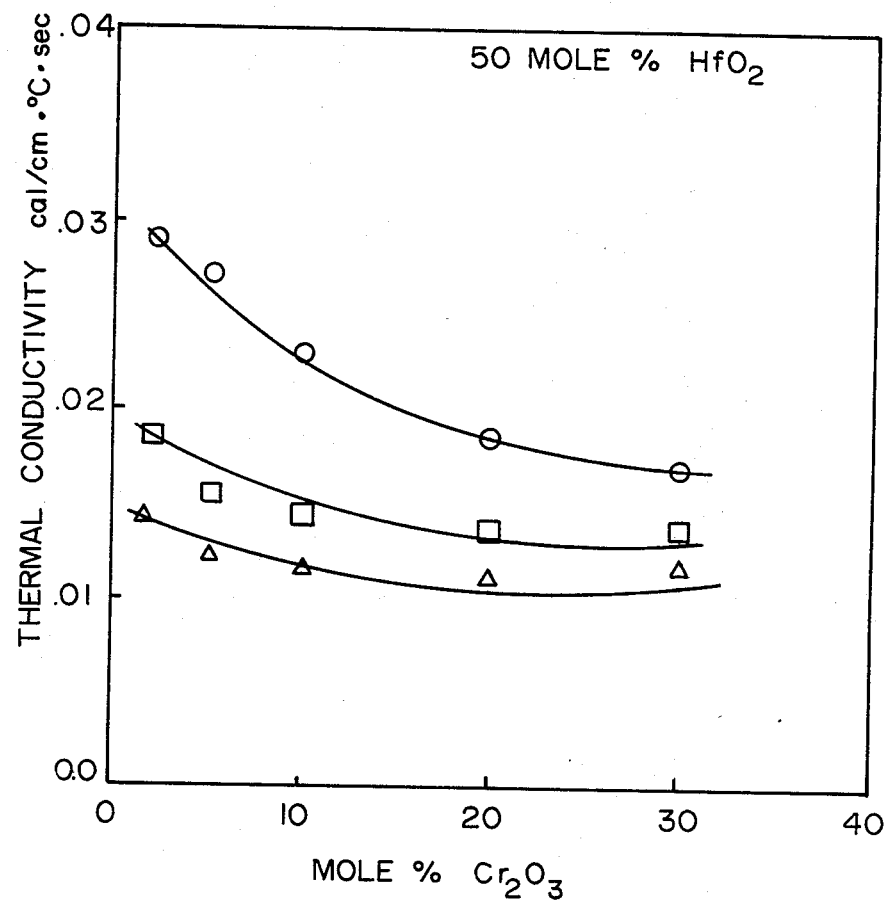

FIGS. 16 through 18 indicate that the hardness of the co-precipitated samples increased with increasing HfO$_2$ content with 0 percent and 5 percent Cr mullite. The hardness stayed relatively constant with increasing HfO$_2$ content with 10 percent mullite. For the mechanically mixed specimens, the hardness generally decreased with increasing HfO$_2$ content. For seven of the ten compositions the hardness of the coprecipitated samples were greater than the corresponding values of the mechanically mixed samples. Thus, the coprecipitation method of sample preparation appears to enhance both fracture toughness and hardness simultaneously.

Figure 23:
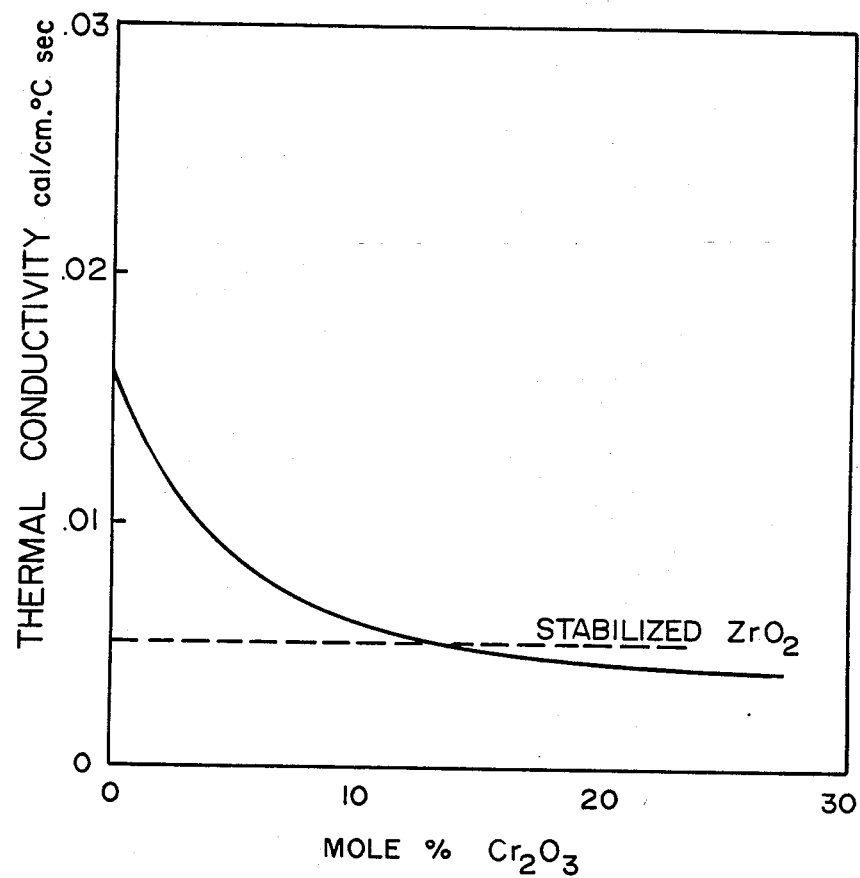

The thermal conductivity of the twenty-two compositions in the alumina system,(Al$_2$O$_3$.xCr$_2$O$_3$)-(ZrO$_2$.yHfO$_2$), prepared in EXAMPLE I were measured at three different temperatures in the previously described thermal conductivity instrument illustrated in FIG. 4. The specimens for these measurements were hot pressed cylinders 3 centimeters in diameter and 2 centimeters in height. Both top and bottom surfaces were lapped with 15 μm diamond disk. The results of the thermal conductivity measurements expressed in cal/cm·° C·sec at the three respective temperatures are given in TABLE III. The sample notations are expressed in terms of the x and y of the above alumina formula and represent the relative mole percent of the Cr$_2$O$_3$ in the matrix phase and the HfO$_2$ in the dispersed phase. The data are also plotted as thermal conductivity versus Cr$_2$O$_3$ content at various HfO$_2$ contents in FIGS. 19 through 22. As indicated in these figures, the curves can be extrapolated back to zero percent CrO$_2$ and no HfO$_2$. From the extrapolation, it can be concluded that pure ZrO$_2$ dispersed in a pure Al$_2$O$_3$ matrix should have a thermal conductivity value of about 0.038 cal/cm·° C·sec. Greve et al (see "Thermal Diffusivity/Conductivity of Alumina with Zirconia Disperesed Phase" Am. Ceram. Soc. Bull. 56 (5) 514-5 (1977)) reported that an Al$_2$O$_3$ matrix containing fifteen volume percent ZrO$_2$ had a thermal conductivity value of 0.018 cal/cm·°C·sec. Thus, the 70° C. thermal conductivity curves in FIGS. 19 through 22 can be normalized by multiplying a factor of 0.018/0.038 to become the normalized curve shown in FIG. 23.

The compositions of the present invention are advantageously employed as transformation toughened ceramics at high temperatures in application that require a balance of physical, chemical and mechanical properties. In particular, the compositions are useful in that the minor constituents can be altered to take advantage of the specific enhancement of critical properties such as hardness, fracture toughness and low thermal conductivity (as demonstrated in the presented test data) without significantly sacrificing the known corrosion, wear and high temperature stability of the major ceramic constituent. As such, the present invention is to be viewed as being directed broadly to a class of novel ceramic compositions wherein the Cr$_2$O$_3$ content in the matrix phase and the HfO$_2$ in the zirconia dispersed phase can varied to achieve the improvement in the critical properties. Similarly, this novel concept is envisioned as being applicable and beneficial at various relative proportions of disperse phase to host matrix phase.

Having thus described and exemplified the preferred embodiments with a certain degree of particularity, it is to be understood that the invention is not limited to the embodiments set forth herein for purposes of exemplification, but is to be limited only by the scope of the attached claims, including a full range of equivalents to which each element thereof is entitled.

I claim:

1. A ceramic composition comprising:
   (a) a matrix phase selected from the group consisting of solid solutions characterized by the formula Al$_2$O$_3$.xCr$_2$O$_3$ and the formula 3Al$_2$O$_3$.2SiO$_2$+x[3Cr$_2$O$_3$.2SiO$_2$] where x is the relative mole fraction of Cr$_2$O$_3$ or 3Cr$_2$O$_3$.2SiO$_2$; and
   (b) a dispersed phase characterized by the formula ZrO$_2$.yHfO$_2$ where y is the relative mole fraction of HfO$_2$.

2. A ceramic composition of claim 1 wherein x is from about 0.1 to about 0.5 and y is from about 0.02 to about 0.3.

3. A ceramic composition of claim 2 wherein said matrix phase is present in about 85 volume percent and said dispersed phase is present in about 15 volume percent.

4. A ceramic composition of claim 1 wherein said matrix phase is Al$_2$O$_3$.xCr$_2$O$_3$.

5. A ceramic composition of claim 4 wherein x is from about 0.1 to about 0.5 and y is from about 0.02 to about 0.3.

6. A ceramic composition of claim 5 wherein said matrix phase is present in about 85 volume percent and said dispersed phase is present in about 15 volume percent.

7. A ceramic compositon of claim 4 wherein x is from about 0.12 to about 0.2 and y is at least about 0.2.

8. A ceramic composition of claim 7 wherein said matrix phase is present in about 85 volume percent and said dispersed phase is present in about 15 volume percent.

9. A ceramic composition of claim 4 wherein said matrix phase is present in about 85 volume percent and said dispersed phase is present in about 15 volume percent.

10. A ceramic composition of claim 1 wherein said matrix phase is $3Al_2O_3.2SiO_2 + x[3Cr_2O_3.2SiO_2]$.

11. A ceramic composition of claim 10 wherein x is from about 0.1 to about 0.5 and y is from about 0.02 to 0.3.

12. A ceramic composition of claim 11 wherein said matrix phase is present in about 85 volume percent and said dispersed phase is present in about 15 volume percent.

13. A ceramic composition of claim 10 wherein said matrix phase is present in about 85 volume percent and said dispersed phase is present in about 15 volume percent.

14. A ceramic composition of claim 1 wherein said matrix phase is present in about 85 volume percent and said dispersed phase is present in about 15 volume percent.

15. A ceramic composition comprising:
    (a) a continuous matrix phase of $Al_2O_3$-$Cr_2O_3$ solid solution; and
    (b) a dispersed phase within said continuous matrix phase of finely divided $ZrO_2$-$HfO_2$ solid solution particles.

16. A ceramic composition comprising:
    (a) a continuous matrix phase of $3Al_2O_3.2SiO_2$-$3Cr_2O_3.2SiO_2$ solid solution; and
    (b) a disperse phase within said continuous matrix phase of a finely divided $ZrO_2$-$HfO_2$ solid solution particles.

17. A ceramic composition comprising finely dispersed zironcium dioxide/hafnium dioxide solid solution particles in a matrix phase of aluminum oxide/chromium oxide solid solution.

18. A ceramic composition comprising finely dispersed zirconium dioxide/hafnium dioxide solid solution particles in a matrix phase of aluminum mullite/chromium mullite solid solution.

* * * * *